April 4, 1939.  A. E. SCHUBERT  2,153,159
FILM GATE FOR ENLARGING PRINTERS
Filed Jan. 29, 1937  2 Sheets-Sheet 1
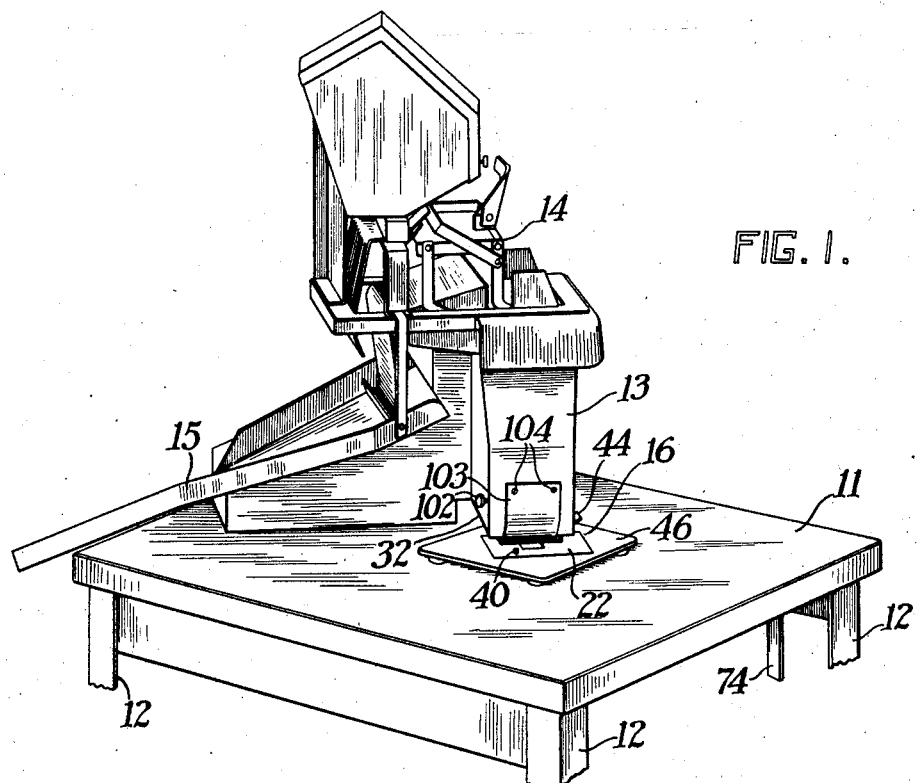
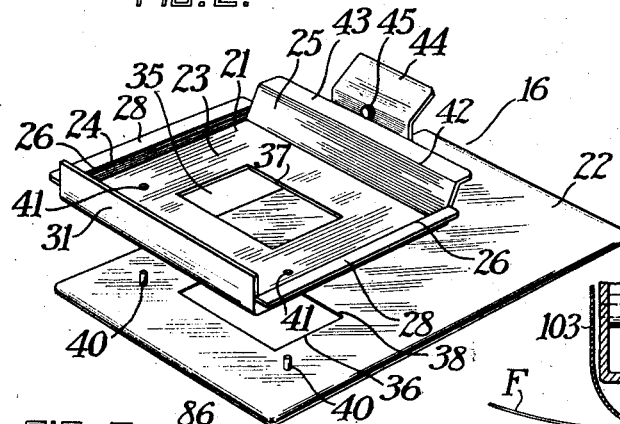
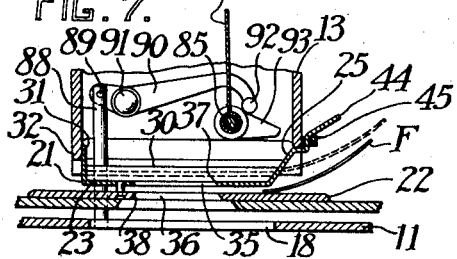
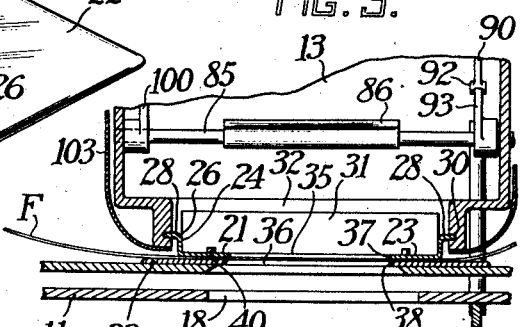
Alvin E. Schubert
INVENTOR.
BY Newton M. Perrins
Donald H. Stewart
ATTORNEYS April 4, 1939.　　A. E. SCHUBERT　　2,153,159
FILM GATE FOR ENLARGING PRINTERS
Filed Jan. 29, 1937　　2 Sheets-Sheet 2
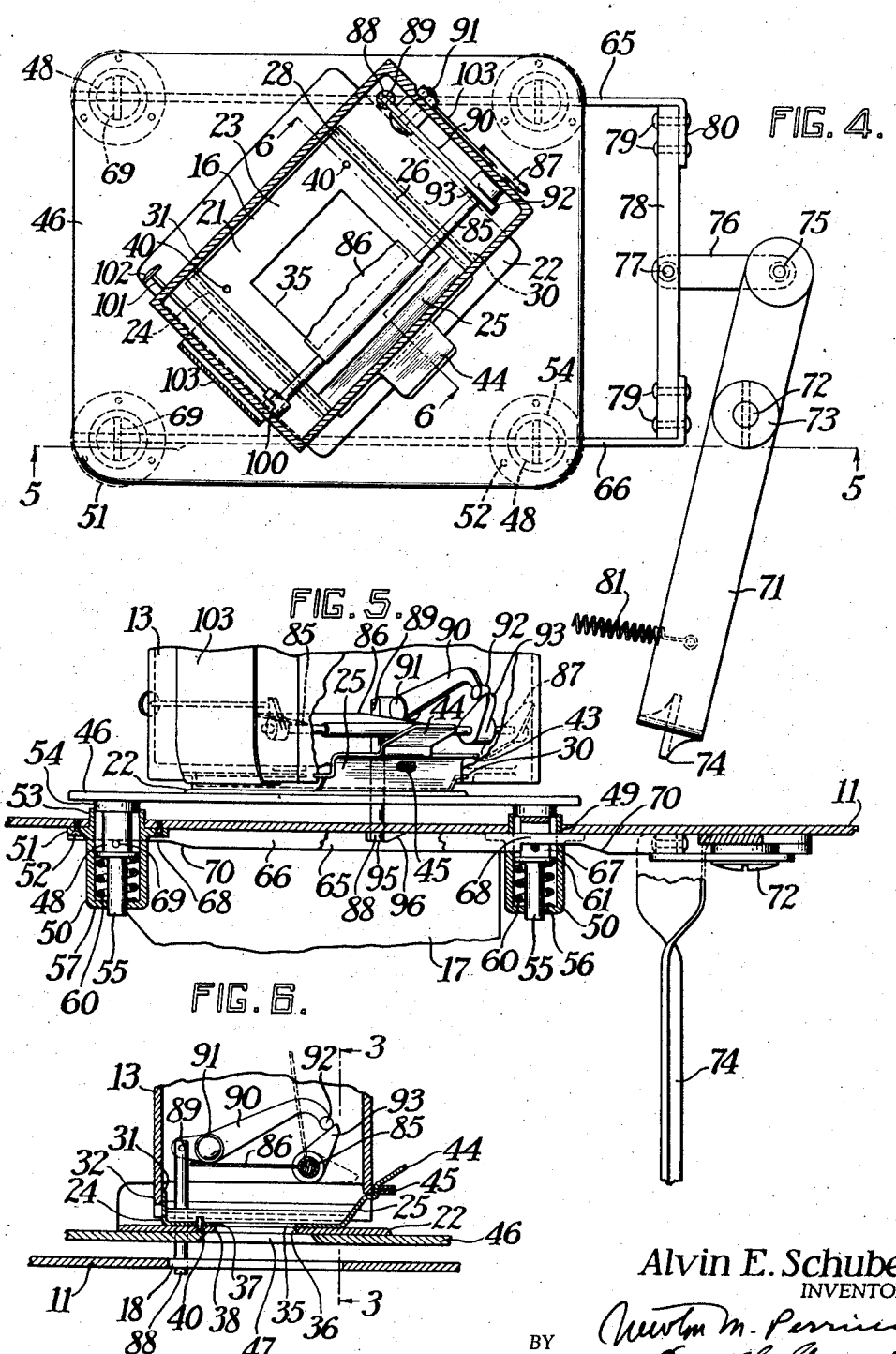
Alvin E. Schubert
INVENTOR.
BY
ATTORNEYS Patented Apr. 4, 1939

2,153,159

UNITED STATES PATENT OFFICE 2,153,159

FILM GATE FOR ENLARGING PRINTERS

Alvin E. Schubert, Rochester, N. Y., assignor to Eastman Kodak Company, Rochester, N. Y., a corporation of New Jersey Application January 29, 1937, Serial No. 123,010

10 Claims. (Cl. 88—24)

This invention relates to photography, and more particularly to a film gate adapted for use with an enlarging printer, and arranged to securely hold and position a strip of miniature film from which enlarged prints may be made by projection. This film gate is particularly designed for use with the enlarging printer shown and described in the patent to R. S. Hopkins, Number 2,033,712, dated March 10, 1936.

One object of the invention is the provision of a film gate adapted for use with miniature negatives in strip form. Another object of the invention is the provision of a gate of this class in which the negatives, in strip form, are easily and quickly positioned in the gate, and, when so positioned are held flat to permit prints to be made therefrom. Still another object of the invention is the provision of a miniature-film gate which comprises two members formed with registering apertures with respect to which the separate negatives are positioned, and which is formed with positioning means which accurately maintain the two gate members in proper alignment so that the apertures thereof will be maintained in register. A further object of the invention is the provision of such a gate with film guiding means which facilitates the feeding or threading of the film strip between the two gate members. A still further object of the invention is the provision of a film gate for miniature film which comprises a stationary gate member and a movable gate member which may be moved relative to the stationary member to open and close the gate. The movable member is normally held in position to close the gate, but is readily movable to open the gate to permit a film strip to be positioned therein. Yet another object of the invention is the provision of a film gate which is so operated as to leave both of the operator's hands free for positioning and threading the film in the gate. Another object of the invention is the provision of a gate operating mechanism which automatically opens a light obstructing shutter and operates a light switch in proper timed relation to the opening and closing of the gate member. By means of such an arrangement the shutter is moved to an open position and the light is turned on as the gate approaches the open position, but when the gate is opened the light switch is turned off and the shutter is moved to a light obstructing position. Another object of the invention is the provision of a plurality of film gates which may be detachably secure to the above-mentioned printer so that prints may be made from a variety of sizes of miniature film negatives in strip form.

To these and other ends, the invention resides in certain improvements and combinations of parts all as will be hereinafter more fully described, the novel features being pointed out in the claims at the end of the specifications.

In the drawings:

Fig. 1 is a perspective view of a portion of the abovementioned enlarging printer, showing the relation thereto of a miniature-film gate constructed in accordance with the present invention.

Fig. 2 is a perspective view of one of the film gates constructed in accordance with the preferred embodiment of the invention, the two gate members being illustrated in disengaged position to show more clearly the positioning pins by which the gate members are maintained in alignment so the apertures thereof will always be in registry.

Fig. 3 is a partial vertical sectional elevation taken substantially on line 3—3 of Fig. 6, showing the arrangement of the gate members in the closed position.

Fig. 4 is horizontal sectional view taken slightly above the gate showing the gate supporting plate and the operating mechanism therefor.

Fig. 5 is a partial vertical sectional view taken substantially on line 5—5 of Fig. 4, showing the gate operating mechanism for opening and closing the gate.

Fig. 6 is a partial vertical sectional view taken substantially on line 6—6 of Fig. 4, showing the mechanism for moving the shutter and operating the light switch.

Fig. 7 is a partial vertical sectional view similar to Fig. 6, but with the gate members in the open position, showing the method of guiding or directing the film strip between the gate members.

The same reference numerals throughout the several views indicate the same parts.

In Fig. 1 there is shown a portion of the enlarging printer embodied in the above-mentioned patent to R. S. Hopkins. This printer comprises broadly, a support having a flat portion or table top 11 which is maintained in proper elevated position by a plurality of legs 12, as clearly illustrated in Fig. 1. A light directing housing 13 is supported by and extends upward from table top 11. The top 11 and the housing 13 may thus be broadly considered as a unitary support. On the upper portion of the housing 13 a printing mechanism, generally indicated by the numeral 14, is arranged in a manner clearly shown and described in the above referred to patent to R. S. Hopkins. A delivery chute 15, such as shown in the applicant's copending application Number 116,313, dated December 17, 1936, is arranged to discharge the exposed prints to the developing bath or to some suitable point of disposal.

In the patent to Hopkins, the negatives in strip form are clamped in position between two layers or sheets of glass which are suitably mounted in an elongated frame. In order to bring the various negatives into exposing position, the frame is moved along the top 11 below the lower end of the housing 13, which is spaced slightly above the top 11, in a manner clearly shown in this patent. Each time a new strip is to be exposed, the frame must be opened, the old strip removed, and a new strip placed therein.

The present invention provides a new improved film gate construction in which only a single miniature negative picture area of the film strip F is securely positioned and clamped to permit prints to be made therefrom, as clearly illustrated in the drawings. After such a print is thus made, the gate may be opened and the film strip moved relative thereto until the next, or any desired negative picture area, is brought into exposing position at which time the gate is again closed to clamp the picture area in position in the printer, all as will be hereinafter more fully described. Such a film gate is simple in construction, easy to load and to position the film therein, eliminates glass clamping strips (which are kept clean with difficulty), and is easily and readily adapted for use with various sizes of miniature film.

The gate, generally indicated by the numeral 16, is positioned intermediate the housing 13 and the table top 11 as illustrated in Figs. 1, 3, 5, and 6. This gate is arranged in the path of the light rays which emanate from the light source, not shown, positioned in a housing 17 mounted below and supported by the table top 11. These light rays pass through an opening 18 in the top 11 and then through the film picture area positioned in the gate 16, and project the image, somewhat enlarged, onto a sensitized receiving surface positioned at 14. The gate is normally in closed position, as shown in Fig. 3, and clamps the film in flat position to permit printing therefrom, but may be opened to permit movement of the film strip therein to bring a different image area into exposing position, as shown in Fig. 7 and hereinafter described.

In the preferred embodiment, the gate comprises an upper stationary gate member 21 and a lower movable gate member 22. The upper member 21 is preferably dished-shaped, as shown in Fig. 2, to form a bottom 23, side walls 24, and a front wall 25. The upper edges of both of the side walls 24 are bent outwardly along the lines 26 to form out-turned flanges or ribs 28 which slidably engage slots or grooves 30 on the opposite sides of the housing 13, as shown in Fig. 3, to detachably secure the upper gate member 21 in stationary position in the housing 13. A back wall 31 may also be provided on the upper gate member 21 if desired. This back wall preferably extends upwardly so as to engage the lower edge 32 of the housing 13 to form a light lock around the rear edge of the gate member.

Referring now to Fig. 3, it is seen that the bottom 23 of upper gate member 21 extends slightly below the lower edges 32 of the housing 13, so that a portion of the strip F is clamped in position between the housing 13 and the table top 11. The bottom 23 is formed with an aperture 35 of suitable size to just frame the image area of the negative to be printed. The lower gate member 22, on the other hand, is preferably in the form of a flat plate which is automatically movable toward the upper member 21 to cooperate with the bottom 23 thereof to clamp the film in a plane, as shown in Fig. 3. When the print has been made, the lower plate 22 is moved downwardly or away from the upper plate 21, in a manner to be presently described, to open the gate so that the film strip F may be removed to bring another negative into position. The plate 22 is also formed with a framing aperture 36 which is held in registry with the aperture 35 in the upper stationary gate member 21 to frame the image area of the negative being printed. The edges of the apertures 35 and 36 are beveled, as shown at 37 and 38, to prevent reflection and to give as sharp an image as possible on the opening formed by the apertures 35 and 36, all of which are well known to those in the art.

In order to position the aperture 36 of the lower gate member 22 in registry with the aperture 35 of the upper gate member 21, means must be provided for securely holding the lower member 22 against lateral movement relative to the upper member 21. Such position means must, however, permit the free vertical movement of the lower member 22 so that the gate may be easily and quickly opened and closed. To this end, the member 22 is provided with a pair of pins 40 which extend upwardly from the member 22 and project into registered opening 41 in the upper member 21, as clearly shown in Figs. 2 and 3. These pins are of such a length that they will not be completely withdrawn from in openings 41 even when the gate is moved to its maximum opening position.

In addition to maintaining the two gate members in proper relative position or alignment, these pins 40 also provide a limit stop against which the film strip F abuts when being positioned in the gate. These pins 40 are so spaced relative to the apertures 35 and 36 that when an edge of the strip F strikes these pins, the image area is framed laterally in the apertures 35 and 36. Longitudinal framing of the strip F is secured by moving or adjusting the strip to the right or left, as viewed in Fig. 3. The pins 40 thus not only maintain gate members 21 and 22 in proper alignment, but also laterally position the film strip in registry with the gate apertures.

In order to facilitate threading of the film strip between the gate members 21 and 22, the front wall 25 of the upper stationary gate member 21 is preferably inclined outwardly, as shown in Figs. 6 and 7 to provide an inclined lateral portion or film guiding surface. In threading the gate, the film strip is inserted from the right, as viewed in Figs. 6 and 7, and on striking the inclined front wall 25, as shown dotted in Fig. 7, is easily and quickly cammed and guided to the full line position so that the strips may be slid between the spaced or open gate member. The strip is then slid between the two gate members 21 and 22 until the strip abuts against the pins 40 which automatically registers the strip with gate apertures 35 and 36, as explained above. The upper edge of the front wall 25 is bent outwardly along the line 42 to provide a flange 43 which extends the full width of the member 22, and to which a gripping member 44 is secured to permit withdrawal of the upper member 21 from the housing 13. The flange 43 engages the lower edge 32 of the housing 13 to afford an effective light lock, as shown in Figs. 6 and 7. The gate members are positioned relative to the table top 11 and the housing 13, in any suitable manner, such for example, by means of a set screw 45 which extends through the member 44 and engages the front wall of the housing 13, as clearly shown in Figs. 6 and 7.

The lower gate member 22 preferably rests loosely on the upper surface of a plate 46 which is provided with an aperture 47 which is in alignment with the opening 18 in the table top 11 and the gate apertures 35 and 36, as shown in Figs. 3 and 6. Plate 46 rests on four plungers 48, of the shape best shown in Fig. 5, which extend through opening 49 in the table top 11 and into hollow cylindrical wells or recesses 50. Each of these wells is of the shape best shown in Fig. 5, and is formed with an annular ring 51 by which the well 50 is secured to the under surface of the top 11 in any suitable manner, such as for example, as by means of screws 52. The upper end 53 of the side wall of each well extends through the opening 49 of the top 11 and thus serves to properly position the well relative to the top 11. The upper end of each of the plungers 48 is formed with a head 54 which is arranged to slide within the hollow well. The lower ends of the plungers are preferably reduced in size, as shown at 55, Fig. 5, and project through openings 56 in the well bottoms 57, all as clearly illustrated in Fig. 5. Coil springs 60 are arranged in each of the wells and surround the reduced portion 55 of the plungers. One end of each spring rests on the inner surface of the bottom 57 of the well 50 while the other end engaged a shoulder or ring 61 formed on the plunger 48. These springs thus engage the ring 61 and tend to move the plungers 48 and the plate 46 upwardly. It is apparent that as the lower gate member 22 rests on the plate 46 it will be carried upwardly with the plate, thus bringing the gate members into closed position to securely clamp the film therebetween.

It is thus evident from the above description, that the gate is normally maintained in closed position by reason of the flexible members or springs 60 which move the plate 46 and the lower gate member 22 upwardly or toward the upper stationary member 21. In order to reduce the bearing area, the plungers 48 are preferably relieved just below the head 54, as indicated in Fig. 5.

In order to move the film strip relative to the gate, it is necessary that the gate be opened so as to unclamp the film strip. To secure this result the present invention provides means for lowering the plate 46 and the gate member 22, against the action of the springs 60, to open the gate. Therefore, the under side of the top 11 has mounted thereon, in any suitable and well-known manner, a pair of levers or push rods 65 and 66, as indicated in Figs. 4 and 5. Each of these push rods extend longitudinally of the top 11 and project through slots 67 in two of the plungers 48, as shown in Figs. 4 and 5. The portions 68 of the push rod which extends through the slots 67 are preferably reduced in size, and are supported on pins 69 which extend across the slots 67 and are secured in opposite sides of the plungers 48. Each push rod is also provided with two inclined cam surfaces 70 positioned slightly to the right of the reduced portion 68, as viewed in Fig. 5.

Referring now to Fig. 5, it is seen that when the push rods 65 and 66 are moved to the left, the cam surfaces 70 thereof will simultaneously engage the pins 69 of the plungers 48, and will depress the latter against the action of the springs 60. The depressing of the plungers 48 will thus lower the plate 46 and the movable gate member 22 to open the gate. This movement, however, is so regulated that the pins 40 on the gate member 22 are never completely withdrawn from the openings 41 in the gate member 21 so that the gate members are never thrown out of proper alignment. When, however, the push rods are moved to the right, as viewed in Fig. 4, the cam surfaces 70 ride off the pin 69 and the springs 60 again automatically move the plungers 48, plate 46, and gate member 22 upwardly toward the stationary gate member 21 to close the gate so as to clamp the film in flat position for printing therefrom.

Any suitable means may be utilized for moving the push rods 65 and 66. It is preferred, however, that such means be operated by a pedal or leg-operated lever so that both of the operator's hands may be free to properly thread and position the film in the gate. In the preferred embodiment, an arm 71 is pivoted at 72, on the screw 73, to the under side of the top 11. One end of this arm is bent downwardly to provide a knee operating lever 74. The other end of the lever 71 is pivoted at 75 to one end of an arm 76, the other end of which is pivoted at 77 to a cross bar 78 connecting the two push rods 65 and 66, in a manner clearly indicated in Fig. 4. Bar 78 may be secured to the push rods 65 ad 66 in any suitable manner, such for example, as by rivets 79 which connect the bar 78 to bent angle portion 80 of the bar 78. It is thus evident from the above description and upon inspection of Figs. 4 and 5, that when the knee lever 74 is moved to the right, the push rods 65 and 66 are moved to the left to depress the plate 46 and the gate member 22, as pointed out above. The push rods 65 and 66 are preferably moved to the right, as viewed in Fig. 5, by means of a spring 81, one end of which is secured to the rod 71, and the other end of which is secured, in any suitable manner, to the under side of the top 11. Thus when the knee lever 74 is released, the spring 81 will automatically move the push rods 65 and 66, levers 76 and 71 to allow the springs 60 to again close the gate, in the manner pointed out above.

Referring now to Figs. 5 and 6, there is shown a shaft 85 rotatably mounted in opposite sides of the housing 13. This shaft carries a shutter 86 which, when the shaft 85 is rotated clockwise, as viewed in Fig. 6, moves the shutter 86 from the full lines positon to the dotted position, Fig. 6, to bring the shutter out of the path of the light rays which pass through the gate apertures 35 and 36. The shaft 85 preferably also carries an eccentric member 87 positioned outside of the housing 13. This eccentric member is arranged to engage a rod, not shown, which is operatively connected to and which controls the light switch for the light source which is mounted in the housing 17. This light switch and the light controlled thereby are fully disclosed and described in the above-referred to patent to R. S. Hopkins. The timing of the shutter and switch is preferably such that the light is turned on and the shutter is opened just slightly before the gate reaches the open position.

To secure this result, the shaft 85 is rotated in timed relation to the movement of the lower gate member 22. In the preferred embodiment, the moving means for the shaft 85 comprises a vertical rod 88 which is pivotally connected at 89 one end of a bell crank 90 which in turn is pivoted at 91, in a manner clearly shown in Fig. 4, to the side of the housing 13. The other end of the bell crank 90 is formed with a bearing member 92 which engages a second eccentric member 93 also mounted on a shaft 85. The lower end of the rod 88 rests on the bottom of a recess 95 formed in the top surface of the push rod 65, as best shown in Fig. 5. The right side of the recess 95, as viewed in Fig. 5, is formed with an inclined cam surface 96 which, when the push rod 65 is moved to the left in the manner above described, comes under the bottom of the rod 88 so that the latter will ride up on this inclined surface thus lifting the push rod 88.

This lifting of the rod 88 rotates the bell crank 90, eccentric 93 and the shaft 85 to open the shutter 86. The arms of the bell crank are so proportioned that this slight movement of the rod 88 is sufficient to move the shutter to open position. When, however, the push rod 65 is returned to normal position, as shown in Fig. 4 and above described, the cam surface 96 is moved out from in under the rod 88 thus rotating the shutter in counterclockwise direction to return the shutter to its light obstructing position.

In view of the above description, it is apparent that the shutter and light switch are operated and controlled in timed relation to the operation of the gate. The cam surfaces 70 and 96 are, however, preferably so positioned that the cam 96 engages the rod 88 slightly in advance of the engagement of the cams 70 with the pins 69, when the lever 74 is moved to the right, as viewed in Figs. 4 and 5. By means of this arrangement, the knee lever 74 may be moved or released slightly so as to open the shutter and to turn on the light so that the strip F may be viewed on a viewing screen to judge the exposure or position of the negative image. A further movement of the knee lever, however, brings the cams 70 into engagement with the pins 69 to open the gate to permit the strip F to be adjusted therein, without releasing the shutter or light switch.

The shaft 85 is also provided with a third eccentric member 100 which is engaged by a push rod 101 supported in the housing 13, as shown in Fig. 4. This push rod is provided with an operating knob 102 by which the shaft 85 may be manually rotated to control the shutter and the light switch.

Various sets of gate members may be used with the above-mentioned enlarger, depending on the type of miniature film from which the prints are to be made. As the various films are of different size, and have the picture areas thereof in different positions relative to the film strip, the apertures of the gate members will necessarily vary in size and arrangement to suit the particular film being used. For example, the type of gate shown in Fig. 2 is adapted for use with film in which the long way of the negative is in the longitudinal direction of the film strip. With such a gate member the film is fed to the gate from the front of the machine, as viewed in Figs. 4 and 5 and in the manner above described. When, however, a film is used in which the long way of the picture is crossways of the film, the gate apertures 35 and 36 and the positioning pins 40 will be turned 90 degrees from that shown in Fig. 2, the size of the apertures, of course, depending on the size of the film area to be printed. With this latter type of film, the strip is fed from the side of the machine or from the side shown in Fig. 1.

To assist in guiding and threading the film strip into the gate when the strip is fed from the side of the housing 13, the sides of the latter are supplied with guide plates 103. These guide plates 103 are secured to the housing 13 by screws 104, and extend downwardly and under the lower end 32 of the housing, as clearly shown in Fig. 3, to accurately guide and thread the film between the two gate members, similar to the manner in which the front wall 25 of the upper gate member is used in connection with the film gate above described. Such strips thus not only assist in guiding and threading of the film in the gate, but also prevent scratching of the film.

When a set of gate members are to be replaced, it is merely necessary to grip the member 44 and to withdraw the upper gate member 21 outwardly from the housing 13. As the pins 40 of the lower member extend into the opening 41 of the upper member, the withdrawal of the upper gate member 21 thus simultaneously removes the lower member 22. When, however, a new set of gate members are to be placed in the printer, the gate members are assembled so that the pins 40 extend into the opening 41. The assembled members are there inserted by placing the ribs 28 of the upper member 21 in the grooves 30 of the housing 13, then sliding the members transversely of the housing until the set screw 45 strikes the housing 13, thus positioning both gate members. As various sizes and shapes of apertures are used, it is evident that the opening 18 on the top 11, and the aperture 47 of the plate 46 should be of such size as to accommodate the maximum aperture arrangement of the gate member.

It is thus apparent from the above description that the present invention provides a new and novel gate construction which is adapted to hold various sizes of miniature film so that a print may be made therefrom. It is also apparent that only the negative to be printed is positioned in the gate member. Such a gate not only securely holds the film flat during printing, but also omits objectionable glass clamping member, provides easy and ready positioning of the film in the gate, maintains the gate member in the proper alignment, and is adapted to be used for a wide variety of different sizes of miniature films.

While only one embodiment of the invention has been disclosed, it is to be understood that the general idea may be carried out in a number of ways. This application is, therefore, not to be limited to the precise details described, but is intended to cover all variations and modifications thereof falling within the spirit of the invention and the scope of the appended claims.

What I claim is:

1. In a photographic printing machine, the combination with a support, of a film gate comprising a pair of detachable gate members removably mounted as a unit on said support for positioning and clamping a film substantially in a plane to permit printing therefrom, said members being formed with registering apertures, means including positioned pins on one of said members for maintaining said apertures in registry one of said members being movable substantially parallel to the other member, to permit said film to be inserted between said gate members, means associated with one of said members for guiding and directing said film between said members, and means for moving said movable member.

2. In a photographic printing machine, the combination with a support, of a film gate comprising a pair of gate members associated with said support for positioning and clamping a film substantially in a plane to permit printing therefrom, said members being formed with registering apertures, one of said members being movable to permit said film to be inserted between said gate members, means for both maintaining said gate members in proper alignment and for positioning said film between said gate members and in registry with said apertures, means for moving said movable member to open and close said gate, and means on one of said members for simultaneously adjusting both of said members relative to said support.

3. In a photographic printing machine, the combination with a support, of a film gate comprising a pair of gate members removably mounted on said support for positioning and clamping a film substantially in a plane to permit printing therefrom, said members being formed with registering apertures, one of said members being held stationary on said support and the other member being movable relative to said stationary member to permit said film to be inserted between said gate members, means on one of said members for maintaining said members in alignment, means on one of said members for positioning said film in registry with said apertures, guide means on said stationary member for guiding and directing said film between said members, a flange on said stationary member engaging said support to provide a light lock, and means for moving said movable member to open and close said gate.

4. In a photographic printing machine, the combination with a support having a substantially horizontal portion, of a film gate comprising a pair of gate members associated with said support for positioning and clamping a film substantially in a plane to permit printing therefrom, said members being formed with registering apertures, an apertured plate movably mounted on said portion, one of said members being positioned on and bodily movable with said plate, cam means engaging said plate to move said plate and said one member to operate said gate, and control means for said cams.

5. In a photographic printing machine, the combination with a support having a substantially horizontal portion, of a film gate comprising a pair of gate members associated with said support for positioning and clamping a film substantially in a plane to permit printing therefrom, said members being formed with registering apertures, an apertured plate movably mounted on said portion, one of said members being positioned on and bodily movable with said plate, flexible means associated with said plate and tending to move said plate and said one member toward the other gate member to close the gate, cam means associated with said support and arranged to contact said plate to move said plate and said one member away from said other member to open said gate, and control means for said cam means.

6. In a photographic printing machine, the combination with a support having a substantially horizontal portion, of a film gate comprising an upper and lower gate member associated with said support and arranged to position and clamp a film substantially in a plane to permit printing therefrom, said members being formed with registering apertures, an apertured plate member on which said lower member is positioned, plungers associated with said horizontal portion and supporting said plate above said portion, resilient means engaging said plungers and tending to move said plate and lower member toward said upper member to close said gate, a plurality of push rods mounted on said support, cams associated with said push rods and arranged to engage said plungers to move said plate and said lower member away from said upper member to open said gate; and control means for said push rods.

7. In a photographic printing machine, the combination with a support, of a film gate comprising a pair of gate members associated with said support for positioning and clamping a film substantially in a plane to permit printing therefrom, said members being formed with registering apertures, one of said members being movable to permit said film to be inserted between said gate members, a pivoted shutter mounted on said support adjacent said gate members, a bellcrank rockably mounted on said support and operatively connected to said shutter to control the latter, means for moving said movable gate member to open and close said gate, a push rod secured at one end to said bellcrank, and a cam on said moving means movable into engagement with the other end of said rod to rock said bellcrank to move said shutter into light obstructing position when said gate is open and movable out of engagement with said other end to permit said shutter to move to non-obstructing position when said gate is closed.

8. In a photographic printing machine, the combination with a support having a flat portion, of a film gate comprising an upper and a lower gate member associated with said support for positioning and clamping a film substantially in a plane to permit printing therefrom, said members being formed with registering apertures, an aperture plate movably mounted on said portion, said lower gate member being positioned on said plate, a plurality of plungers secured to said plate and extending into recesses formed in said flat portion, spring means in said recesses and engaging said plungers to move said plate and said lower gate member toward said upper gate member to close said gate, a plurality of push rods mounted on said flat portion, said push rods having cam surfaces formed thereon and arranged to engage cooperating surfaces on said plungers to move said plate and said lower gate member away from said upper gate member to open said gate, a light source mounted on said support and arranged to project light rays through said apertures, a switch for said light source, a shutter mounted on said support adjacent said gate, a single means for operating said shutter and said switch, one of said push rods being formed with an auxiliary cam for controlling said single means, and an operating lever for moving said push rods.

9. In a photographic printing machine, the combination with a support having a substantially horizontal portion, of a gate comprising an upper and a lower gate member for positioning and clamping a film substantially in a plane to permit printing therefrom, said members being formed with registering apertures, means associated with one of said members for guiding and directing said film between said members, positioning means associated with certain of said gate members both to retain said gate member in alignment and to position said film in said gate relative to said apertures, an apertured plate adjacent said horizontal portion and carrying said lower gate member, springs associated with said horizontal portion and engaging parts of said plate, said springs tending to move said plate and said lower gate member in one direction to close said gate, means including cams arranged to move said plate and said lower gate member in the opposite direction to open said gate, and a control lever for said cams.

10. In a photographic printing machine, the combination with a support having a substantially flat portion, of a gate comprising a pair of gate members associated with said support for positioning and clamping a film substantially in a plane to permit printing therefrom, one of said members being held stationary on said support and the other of said members being movable relative to said stationary member to open and close said gate, means associated with said stationary member for guiding and directing said film between said members, means associated with said movable member and cooperating with said stationary member to both retaining said members in alignment and to position said film relative to said apertures, an apertured plate adjacent said horizontal portion to support said movable member, resilient means associated with said horizontal portion and acting on said plate to move the plate and the movable gate member toward the stationary member to close said gate, a light source mounted on said support and arranged to project light rays through said apertures, a control switch for said light source, a shutter mounted on said support adjacent said gate, cam means for moving said plate and said movable member away from said stationary member to open said gate, means controlled by said last mentioned means for controlling said shutter and said switch in timed relation to the movement of said movable member, and a control lever for operating said cam means.

ALVIN E. SCHUBERT.